(12) United States Patent
Perkins et al.

(10) Patent No.: US 7,068,262 B2
(45) Date of Patent: Jun. 27, 2006

(54) WRITING STYLUS FOR ELECTROGRAPHIC POSITION LOCATION APPARATUS

(75) Inventors: Michael Perkins, Santa Clara, CA (US); Peter Nevil Milford, Los Gatos, CA (US); Kim Voskuil, Fremont, CA (US); Larry Lynch, Los Gatos, CA (US); Julie Wu Kuei Yao Willey, Palo Alto, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 75 days.

(21) Appl. No.: 10/457,981

(22) Filed: Jun. 9, 2003

(65) Prior Publication Data
US 2004/0246211 A1 Dec. 9, 2004

(51) Int. Cl.
*G09G 5/00* (2006.01)
(52) U.S. Cl. .................. 345/179; 345/173; 178/19.01
(58) Field of Classification Search ........ 345/173–179; 178/18.01–18.1, 19.01–19.5
See application file for complete search history.

(56) References Cited

U.S. PATENT DOCUMENTS

| | | | |
|---|---|---|---|
| 2,182,334 A | 12/1939 | Crespo | |
| 2,932,907 A | 4/1960 | Stieber, et al. | |
| 3,292,489 A | 12/1966 | Johnson et al. | |
| 3,304,612 A | 2/1967 | Proctor et al. | |
| 3,530,241 A | 9/1970 | Ellis | |
| 3,591,718 A | 7/1971 | Asano et al. | |
| 3,798,370 A | 3/1974 | Hurst | |
| 3,886,311 A | 5/1975 | Rodgers et al. | |
| 3,911,215 A | 10/1975 | Hurst et al. | |
| 3,921,165 A | 11/1975 | Dym | |
| 4,220,815 A | 9/1980 | Gibson et al. | |
| 4,492,819 A | 1/1985 | Rodgers et al. | |
| 4,570,149 A | 2/1986 | Thornburg et al. | |
| 4,603,231 A | 7/1986 | Reiffel et al. | |
| 4,630,209 A | 12/1986 | Saito et al. | |
| 4,650,926 A | 3/1987 | Nakamura et al. | |
| 4,686,332 A | 8/1987 | Greanias et al. | |
| 4,706,090 A | 11/1987 | Hashiguchi et al. | |
| 4,853,498 A | 8/1989 | Meadows et al. | |
| 4,853,499 A | 8/1989 | Watson | |
| 4,913,463 A | 4/1990 | Tlapek et al. | |
| 4,922,061 A | 5/1990 | Meadows et al. | |
| 5,007,085 A | 4/1991 | Greanias et al. | |
| 5,030,117 A | 7/1991 | Delorme | |
| 5,057,024 A | 10/1991 | Sprott et al. | |
| 5,113,178 A | 5/1992 | Yasuda et al. | |
| 5,117,071 A | 5/1992 | Greanias et al. | |
| 5,149,919 A | 9/1992 | Greanias et al. | |

(Continued)

FOREIGN PATENT DOCUMENTS

EP 539053 A1 4/1993

(Continued)

OTHER PUBLICATIONS

British Micro, "Operating Guide to Grafpad", 1982, 28 pp.

*Primary Examiner*—Xiao Wu
(74) *Attorney, Agent, or Firm*—Townsend and Townsend and Crew, LLP

(57) ABSTRACT

A stylus for an electrographic position location apparatus is disclosed. In one embodiment, the stylus includes a writing element that is retractable. The stylus may have a proximal end and a distal end. A conductive annular structure may be at the proximal end of the stylus.

36 Claims, 14 Drawing Sheets

U.S. PATENT DOCUMENTS

| | | |
|---|---|---|
| 5,157,384 A | 10/1992 | Greanias et al. |
| 5,220,136 A | 6/1993 | Kent |
| 5,313,051 A * | 5/1994 | Brigida et al. ............... 235/375 |
| 5,417,575 A | 5/1995 | McTaggart |
| 5,438,168 A | 8/1995 | Wolfe et al. |
| 5,485,176 A | 1/1996 | Ohara et al. |
| 5,486,847 A * | 1/1996 | Ranf et al. .................. 345/173 |
| 5,575,659 A | 11/1996 | King et al. |
| 5,686,705 A | 11/1997 | Conroy et al. |
| 5,730,602 A * | 3/1998 | Gierhart et al. .............. 434/155 |
| 5,739,814 A * | 4/1998 | Ohara et al. ................. 345/173 |
| 5,877,458 A | 3/1999 | Flowers |
| 5,913,629 A * | 6/1999 | Hazzard ...................... 401/33 |
| 6,002,387 A | 12/1999 | Ronkka et al. ............. 345/157 |
| 6,227,743 B1 * | 5/2001 | Robb ........................ 401/243 |
| 6,307,956 B1 * | 10/2001 | Black .......................... 382/124 |
| 6,355,889 B1 * | 3/2002 | Butcher et al. .......... 178/18.03 |
| 6,396,481 B1 * | 5/2002 | Challa et al. ................ 345/169 |
| 6,450,721 B1 * | 9/2002 | D'Amico et al. ........... 401/258 |
| 6,661,405 B1 * | 12/2003 | Flowers ...................... 345/173 |
| 6,700,567 B1 * | 3/2004 | Jaeger et al. ............... 345/179 |
| 2002/0036621 A1 * | 3/2002 | Liu et al. .................... 345/173 |

FOREIGN PATENT DOCUMENTS

| | | |
|---|---|---|
| JP | 57-038486 | 3/1982 |
| JP | 61-46516 | 3/1986 |
| JP | 5-137846 | 6/1993 |
| JP | 5-217688 | 8/1993 |

* cited by examiner

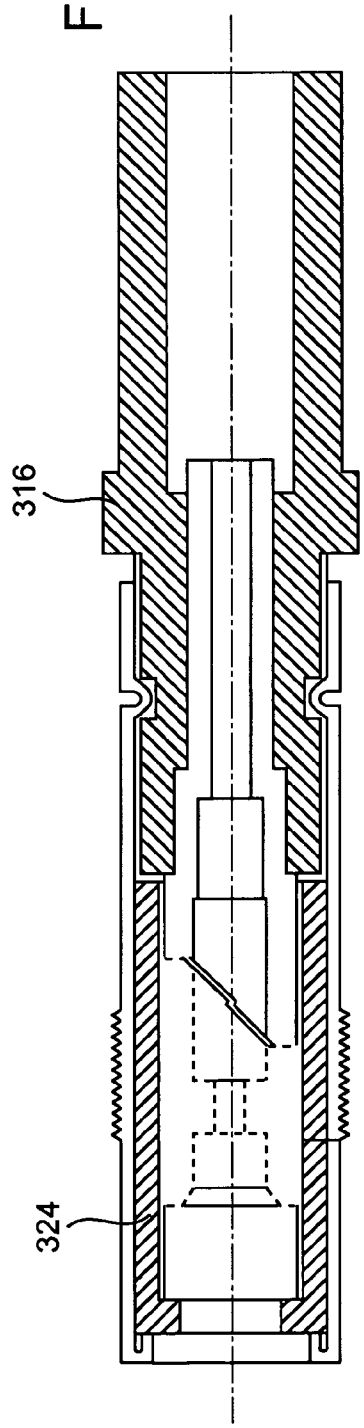
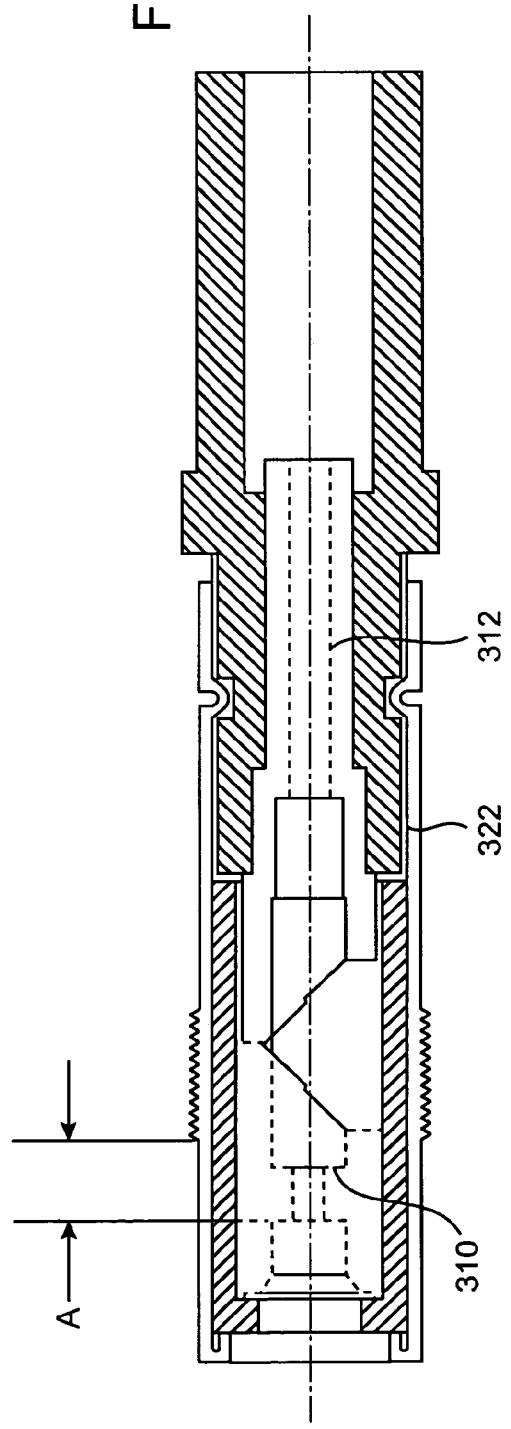

ated in Ohara et al. includes a lower base portion and
WRITING STYLUS FOR ELECTROGRAPHIC POSITION LOCATION APPARATUS

BACKGROUND OF THE INVENTION

A number of electrographic position location apparatuses have been described. One such apparatus is described in U.S. Pat. No. 5,485,176 to Ohara et al. The apparatus that is described in Ohara et al. includes a lower base portion and a pivotal back structure upon which a book rests. The back structure contains electronics. A video monitor is in communication with electronics in the back structure. A stylus is used to select images on open pages in the book and some response is then seen on the video monitor.

While the apparatus described in Ohara et al. is useful, a number of improvements can be made. For example, the apparatus described in Ohara et al. does not use a writing element. Writing is necessary for learning how to write letters and numbers. Writing is also an important tool for teaching a child a complex subject such as math. For example, many students cannot learn math without writing down equations and numbers. Accordingly, it would be difficult to teach someone a subject such as math and writing using the apparatus described in Ohara et al.

Students have learned about subjects such as math using traditional learning tools such as books, paper, pencils, and personalized instruction. While such learning tools are effective, they are not fun, engaging, or interactive.

Accordingly, it would be desirable if traditional learning tools such as pencils, pens, paper, and/or books could be used in a more interactive way that can be entertaining, educational and engaging for students.

Embodiments of the invention address these and other problems.

SUMMARY OF THE INVENTION

Embodiments of the invention are directed to styluses for electrographic position location apparatuses, electrographic position location apparatuses, and methods for using the styluses and electrographic position location apparatuses.

One embodiment of the invention is directed to a stylus for an electrographic position location apparatus comprising a surface, the stylus comprising: (a) a distal end region; (b) a proximal end region; (c) a writing element including a first end portion proximate to the distal end region and a second end portion proximate to the proximal end region; and (d) a conductive annular structure having a continuous and solid side surface at the distal end region of the stylus, wherein the conductive annular structure is around the first end portion of the writing element, and wherein the conductive annular structure is adapted to receive or transmit an electromagnetic signal when the stylus is over the surface.

Another embodiment of the invention is directed to a stylus assembly comprising: (a) a stylus comprising (i) a distal end region, (ii) a proximal end region, and (iii) a retractable writing element having a first end portion proximate to the distal end region of the stylus and a second end portion proximate to the proximal end region of the stylus; and (b) a cable coupled to the proximal end region of the stylus, wherein the cable comprises a conductor.

Another embodiment of the invention is directed to an electrographic position location apparatus comprising: (a) a housing comprising a surface; (b) an antenna under the surface; (c) a processor coupled to the antenna; (d) a stylus comprising (i) a distal end region, (ii) a proximal end region, (iii) a writing element including a first end portion proximate to the distal end region and a second end portion proximate to the proximal end region; and (iv) a conductive annular structure having a continuous and solid side surface around at least the first end portion of the writing element, and being at the distal end region of the stylus; (e) a cable coupling the proximal end region of the stylus to the housing; and (f) an output device coupled to the processor.

Another embodiment of the invention is directed to an electrographic position location apparatus comprising: (a) a housing comprising a surface; (b) an antenna under the surface; (c) a processor coupled to the antenna; (d) a stylus comprising (i) a distal end region, (ii) a proximal end region, and (iii) a retractable writing element including a first end portion proximate to the distal end region and a second end portion proximate to the proximal end region; (e) a cable connecting the proximal end region of the stylus to the housing; and (f) an output device coupled to the processor.

Another embodiment of the invention is directed to an electrographic position location apparatus comprising: (a) a housing comprising a surface; (b) an antenna under the surface; (c) a processor coupled to the antenna; (d) a stylus comprising (i) a distal end region, (ii) a proximal end region, and (iii) a conductive writing element including a first end portion proximate to the distal end region and a second end portion proximate to the proximal end region; (e) a cable connecting the proximal end region of the stylus to the housing; and (f) an output device coupled to the processor, wherein the antenna and the writing element are in electrical communication during use.

Another embodiment of the invention is directed to a method comprising: (a) writing on a sheet in a print medium on a surface of a housing of an electrographic position location apparatus using a stylus including a retractable writing element, wherein the writing element is in an extended position; (b) retracting the writing element into the stylus; and (c) selecting a print element in the print medium using the stylus when the writing element in the stylus is in a retracted position.

These and other embodiments of the invention are described in further detail below.

BRIEF DESCRIPTION OF THE DRAWINGS

FIGS. 6(a) and 6(b) show cross-sectional views of interacting cam members in a stylus interacting to cause a writing element to be in an extended or a retracted position.

Figure 1:
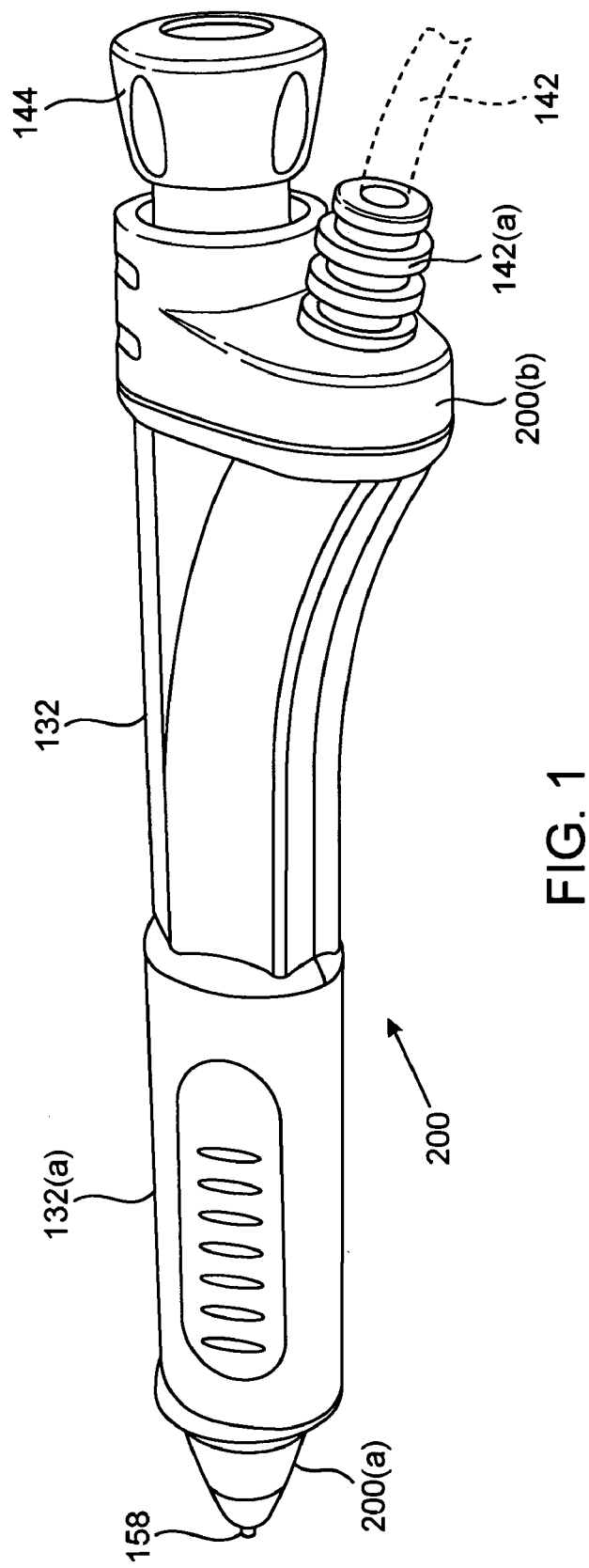
FIG. 1 shows a perspective view of a stylus that includes a writing element.

These and other embodiments are described in further detail below in the Detailed Description with reference to the Figures.

DETAILED DESCRIPTION

One embodiment of the invention is directed to a stylus for use in an electrographic position location apparatus. The stylus is capable of writing or marking on a writing surface. The writing surface may be a surface on a sheet of paper, a surface on an erasable sheet in a book, etc.

The electrographic position location apparatus comprises a housing with a surface. The sheet of paper, book, etc. can be on the surface of the housing. As will be described in further detail below, the housing may contain signal processing electronics including a microprocessor, at least one antenna, and an output device. The at least one antenna can be under a surface of the housing and may transmit an electromagnetic signal to a receiving antenna in the stylus above the surface. The stylus may be tethered to the housing via a cable. The cable electrically and mechanically couples the antenna in the stylus with the signal processing electronics. When the antenna in the stylus receives the signal, the signal is then transmitted to the signal processing electronics via the cable.

An output device may then produce an output (e.g., an audio or visual output) that corresponds to the location where the stylus was present. For example, the stylus may be positioned over the letter "A" on a sheet that is on the surface of the housing and over a signal transmitting conductive finger under the surface. Signal processing electronics identify the particular signal being transmitted by the conductive finger, and subsequently determine that the stylus is over the letter A. A corresponding output such as "A says Ahh" may then sound through an output device such as a speaker. In other embodiments, the output device may be a display like an LCD (liquid crystal display) or an LED (light emitting diode).

In the electrographic position location apparatus described above, the stylus includes a receiving antenna that receives an electromagnetic signal from under a surface of a housing. However, in other embodiments, it is possible for the stylus to include a transmitting antenna while the antenna under the surface receives an electromagnetic signal transmitted from the transmitting antenna. In this latter embodiment, the transmitting antenna in the stylus transmits a signal, which is received by one or more conductive fingers of one or more antennas under the surface of a housing. Using the activated conductive fingers, signal processing electronics in the electrographic position location apparatus can determine the location of the stylus and can provide an appropriate output for the particular location.

In some embodiments, the antenna in the stylus includes a conductive annular structure that is at a distal end of the stylus and is around a first end portion of the writing element. As will be explained in further detail below, the conductive annular structure advantageously allows the stylus to receive the signal from the antenna under the surface of the housing, regardless of the orientation of the stylus. A preferred conductive annular structure is a conductive cone. Although conductive cones are described in detail below, it is understood that any suitable conductive annular structure may be used in the stylus. For example, the conductive annular structure could alternatively be a conductive ring, a conductive cylinder, a stack of conductive hoops, etc. The conductive annular structure may comprise any suitable conductive material including copper or aluminum conductors, or conductive polymers.

The conductive annular structures preferably have a solid and continuous conductive side surface (e.g., like a solid cylinder or a solid cone), as opposed to, for example, a loop of wire which forms a discontinuous and non-solid surface in a conductive annular structure. Loops of wires, for example, can provide different output signals when the stylus is at an angle and when the stylus is perpendicular. It is desirable if the same output signal is generated regardless of how the stylus is oriented above a particular point on a surface.

The electrographic position location apparatuses according to embodiments of the invention may have any suitable end use. In preferred embodiments, the electronic position location apparatus is an educational learning aid, which is adapted to teach the user about one or more subjects. Exemplary subjects include math, reading, writing, geography, science, geometry, etc.

The electrographic position location apparatus may be in any suitable form. For example, in some embodiments, the electrographic position location apparatus may include a housing in the form of a platform with a book on the platform. The stylus may be used to select words, symbols, or pictures in the book using the stylus, and/or may write in the book using the writing element in the stylus. In another embodiment, the electrographic position location apparatus may be in the form of a globe with a base (both of which may form a housing), with a stylus coupled to the base. In yet other embodiments, the electrographic position location apparatus can be a graphics tablet type device that can automatically translate drawings made using the stylus into an electronic image on a display screen.

The stylus in the electrographic position location apparatus comprises a distal end region and a proximal end region. As noted above, a conductive annular structure such as a conductive cone is at the distal end region of the stylus. The conductive annular structure is around a first end portion of a writing element in the stylus. The conductive annular structure and an electrical conductor in the stylus may form the antenna in the stylus. The conductor may be oriented generally coaxial (or parallel to) with the writing element. The antenna in the stylus may be adapted to receive an electromagnetic signal from a transmitting antenna under the surface of the housing.

Any suitable writing element can be used in the stylus. Exemplary writing elements may comprise some sort of erasable writing material such as pencil lead or erasable ink. Specific examples of writing elements include pencils (mechanical and non-mechanical), wood pencils, chalk, automatic pencils, free-standing pencil leads, pens, pen refill cartridges, markers, crayons, etc. Preferably, the writing element is an automatic pencil with an automatic lead feeding mechanism. A preferred writing element is an automatic pencil sold under the tradename "Sensematic", which is commercially available from Dixon Ticonderoga, Inc.

Automatic pencils with automatic lead feeding mechanisms will be discussed in further detail below.

The writing material (e.g., ink, pencil lead, etc.) that is used in the writing element is preferably non-conductive. The use of a non-conductive writing material can reduce the likelihood that the writing material will not interfere with the signal transmitting antenna under the surface of the housing of the electrographic position location apparatus. Also, a conductive writing material that is inside of the stylus may interfere with signals that are being transmitted by the stylus or received by the stylus. If a conductive writing material is used, a separate ground shield needs to be included for the writing element in the stylus.

The writing element in the stylus may include a first end portion proximate to the distal end region of the stylus and a second end portion proximate to the proximal end region of the stylus. The first end portion of the writing element corresponds to the portion of the writing element that is used for writing.

In some embodiments, the writing element may be a retractable writing element. Accordingly, the writing element in the stylus may or may not be capable of writing, depending on the user's desire. The tip of the writing element may be inside of the stylus when the stylus is in a retracted position. The tip of the writing element may extend outwardly from the distal end of the stylus when the writing element is in an extended position so that the user may write with the stylus. The stylus can be capable of receiving (or transmitting) an electromagnetic signal when the writing element is either in an extended position or a retracted position.

FIG. 1 shows a stylus 200 according to an embodiment of the invention. The stylus 200 includes a distal end region 200(a) and a proximal end region 200(b). The stylus 200 also includes a stylus housing 132. A conductive grip 132(a) is on the stylus housing 132 and may include a gripping surface so that the stylus 200 does not easily slip out of the user's hand.

The distal end region 200(a) of the stylus 200 includes a writing tip 158, which may correspond to a first end portion of a writing element (not shown in FIG. 1) that is inside of the stylus 200. The proximal end region 200(b) of the stylus 200 includes a threaded cap 144 that is insertable inside of a second end portion of the writing element inside of the housing 132. As will be explained in detail below, a user can cause the writing tip 158 to extend and retract by turning the threaded cap 144 clockwise or counterclockwise.

A cable 142 is shown in dotted lines and passes through a strain relief element 142(a) at the proximal end region 200(b) of the stylus 200. The stain relief element 142(a) supports the cable 142 when the stylus 200 is used. It reduces the strain on the cable 142 at the point where the cable 142 exits the housing 132. Together, the cable 142 and the stylus 200 (and optionally other elements) may form a stylus assembly that can be used in an electrographic position location apparatus.

The cable 142 can house at least two electrical conductors (e.g., wires) (not shown in FIG. 1). Preferably, the cable 142 is a co-axial cable with a first conductor being a linear wire and a second conductor being an annular wire to shield the inner linear wire. The first conductor may be a conductor that electrically couples a conductive annular structure inside of the stylus housing 132 to signal processing electronics in the electrographic position location apparatus. The second conductor may electrically couple the conductive grip 132(a) to a signal neutral point such as ground.

It is desirable to ground the user by providing the conductive grip 132 on the stylus housing 132. As noted above, electromagnetic signals can be received from an antenna under a surface of the housing of the electrographic position location apparatus. A receiving antenna in stylus 200 can receive these signals. However, during use, the user may also receive extraneous electromagnetic signals from the surrounding environment, and these received signals may be inadvertently transmitted to the receiving antenna in the stylus 200 and can interfere with desired signals. However, when the user is in contact with the conductive grip 132, any electromagnetic signals passing through the user are sent to ground. They do not interfere with signals that are eventually sent through the stylus 200 to the signal processing electronics.

Figure 2A:
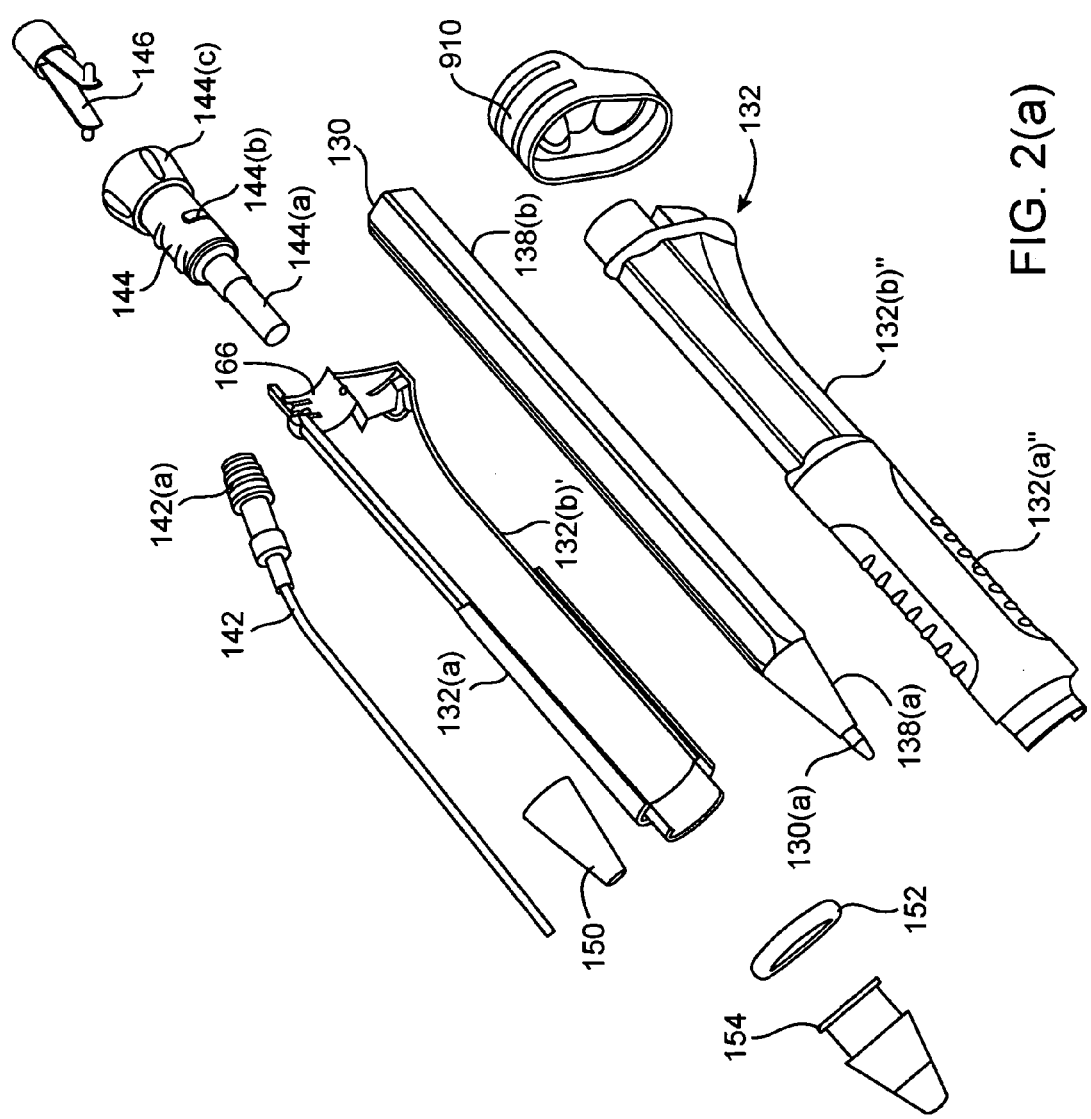
FIG. 2(a) shows an exploded view of a stylus.

FIG. 2(a) is an exploded view of some components of a stylus 200 according to an embodiment of the invention. Stylus housing 132 includes two housing portions 132(b)', 132(b)" with two corresponding conductive grip portions 132(a)', 132(a)" that will eventually form the conductive grip 132. A ring 152 and a nose 154 at the distal end 200(a) of the stylus 200 secure the parts of the stylus 200 at the distal end 200(a) together. A cap 910 is at the proximal end region 200(b) of the stylus and supports the strain relief element 142(a) and the threaded cap 144.

A writing element 130 in the form of a mechanical pencil is present in the housing 132. The writing element 130 has a first end portion 138(a) proximate to the distal end region 200(a) of the stylus 200. A second end portion 138(b) of the writing element 130 is proximate to the proximal end region 200(b) of the stylus 200.

The writing element 130 also includes a slide member 130(a) at the first end portion 138(a) of the writing element 130. When the slide member 130(a) is pushed upward by the downward motion of the writing element 130 onto a writing surface, the pencil lead (not shown in FIG. 2(a)) inside of the writing element 130 automatically feeds outward and downward toward the writing surface.

It is desirable to use a writing element 130 with an automatic lead feeding mechanism. Because the writing element 130 is present in the stylus housing 132, it is difficult for a user to directly manipulate the writing element 130 to cause, for example, pencil lead to come out of the writing element 130. Since the lead automatically feeds to the appropriate length for writing, the user need not worry about feeding too much or too little lead. Also, if the electrographic position location apparatus is to be used by children, pencil leads that extend too far out of the stylus can break. This can frustrate children. When a writing element 130 of the type shown in FIG. 2(a) is used, the slide member 130(a) protects the pencil lead inside of it from breaking. The lead is automatically fed just to the tip of the slide member 130(a) and does not extend too far outward. Accordingly, when using the stylus 200, the user need not worry about breaking pencil lead. A more detailed discussion of the writing element 130 is provided below.

A threaded cap 144 including a first end section 144(a), a middle grooved section 144(b), and a second end section 144(c) is at the proximal end portion 200(b) of the stylus 200. The first end section 144(a) of the threaded cap 144 inserts into the second end portion 138(b) of the writing element 130. The grooves at the middle grooved section 144(b) may engage grooves 166 at an end portion of the stylus housing 132 so that the threaded cap 144 is secured to the writing element 130.

When the stylus 200 is fully assembled, the user may manipulate (e.g., turn) the second end section 144(c) of the threaded cap 144 to (i) extend the writing element, (ii) retract the writing element 130, and/or (iii) remove the writing element 130 from the housing 132. The user may want to remove the writing element 130 from the stylus housing 132 to replace it or re-supply it with an appropriate writing material (e.g., a new pencil lead).

A detent member 146 with three adjustable positions fits within the threaded cap 144 and has a structure that allows the treaded cap 144 to be re-positioned. The detent member 144 has lateral projections that extend laterally past the threaded cap 144 to engage grooves at the inner surface of the stylus housing 132.

The strain relief element 142(a) is connected to a coaxial cable 142, which passes through the housing 132 and runs parallel to the writing element 130. The coaxial cable 142 includes an inner conductor that is electrically coupled to the conductive cone 150, and an outer conductor that is electrically coupled to the conductive grip 132. The inner and outer conductors may be electrically isolated from each other. Together, the inner conductor in the coaxial cable 142 and the conductive cone 150 can form a receiving antenna, which can receive an electromagnetic signal and transmit it to the appropriate signal processing electronics in the electrographic position location apparatus. At least part of the first end portion 138(a) of the writing element 130 passes through a conductive cone 150 at the distal end of the stylus 200.

Figure 2B:
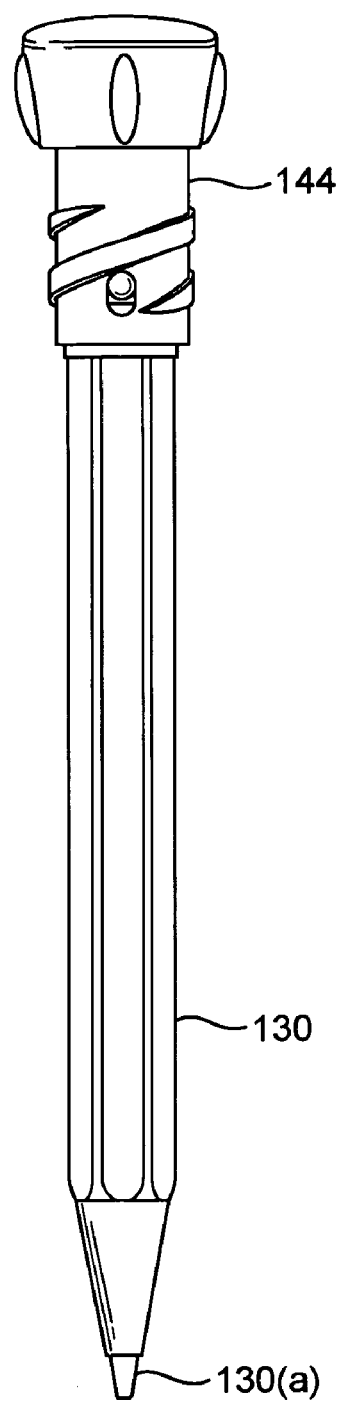
FIG. 2(b) shows a mechanical pencil with a threaded cap.

FIG. 2(b) shows the combination of the writing element 130 and the threaded cap 144. The combination shown in FIG. 2(b) is insertable in the stylus housing 132. When the user turns the writing element 130, the entire writing element 130 may be withdrawn into the stylus housing 132 (as opposed, for example, to withdrawing only the lead of the writing element 130). A user may separate the threaded cap 144 from the writing element 130 in order to fill the writing element 130 with lead.

Figure 2C:
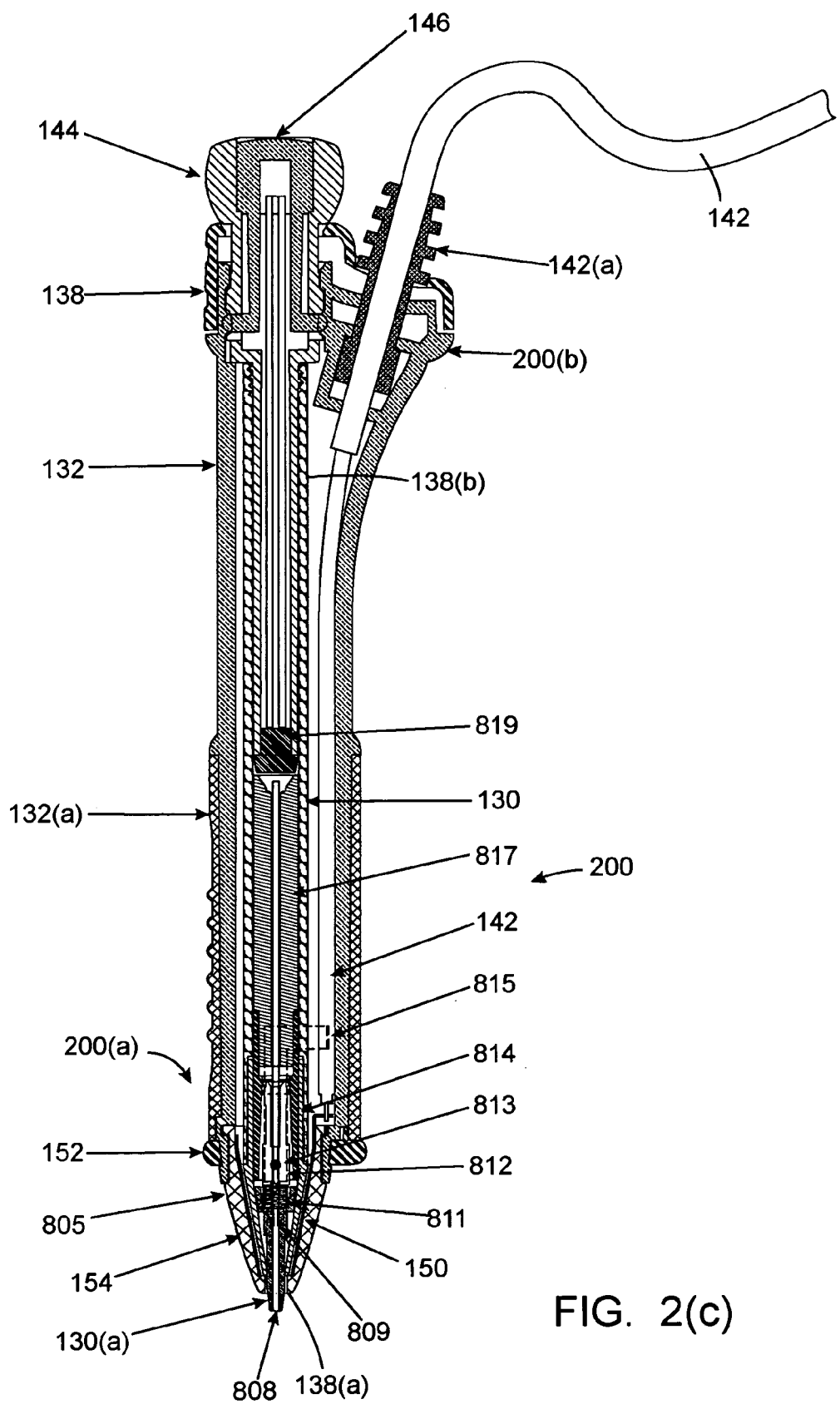
FIG. 2(c) shows a cross-sectional view of a stylus according to an embodiment of the invention.

FIG. 2(c) shows a cross-sectional view of the stylus 200 when all of its components are assembled together. The description of the stylus 200 above with respect to FIGS. 2(a) and 2(b) also applies to FIG. 2(c).

In addition, FIG. 2(c) shows some more details of some other features. For example, FIG. 2(c) shows an external ground shield 805 at the proximal end 200(a) of the stylus 200. The external ground shield 805 can be formed by a conductive paint (e.g., silver paint). An internal ground shield contact structure 815 (shown by dotted lines) electrically couples the conductive grip 132(a) and the ground shield 805 to a grounded conductor in the cable 142. The grounded conductor (not shown in FIG. 2(c)) in the cable 142 may be a sheath-type conductor that shields an inner signal transmitting conductor.

In FIG. 2(c), the lateral projections of the detent member 146 can also be seen. These lateral projections extend laterally past the threaded cap 144 and engage the inner surface of the stylus housing 132.

FIG. 2(c) also shows some additional details of the writing element 130. The writing element 130 includes a slide member 130(a) at a first end portion 130(a) of the writing element 130. The slide member 130(a) houses a pencil lead 808 (which may be colored, black, and optionally non-conductive). A retainer ring 809 is under a compression spring 811, which is disposed around a clip member 812. A stainless steel ball 813 is adjacent to the clip member 812. A clamp structure 814 is around the clip member 812. A pencil lead support 817 supports pencil lead 808. A pencil plug 819 is in the middle of the writing element 138. The operation of a writing element 130 of the type shown in FIG. 2(c) will be described below with reference to FIG. 3.

Figure 3:
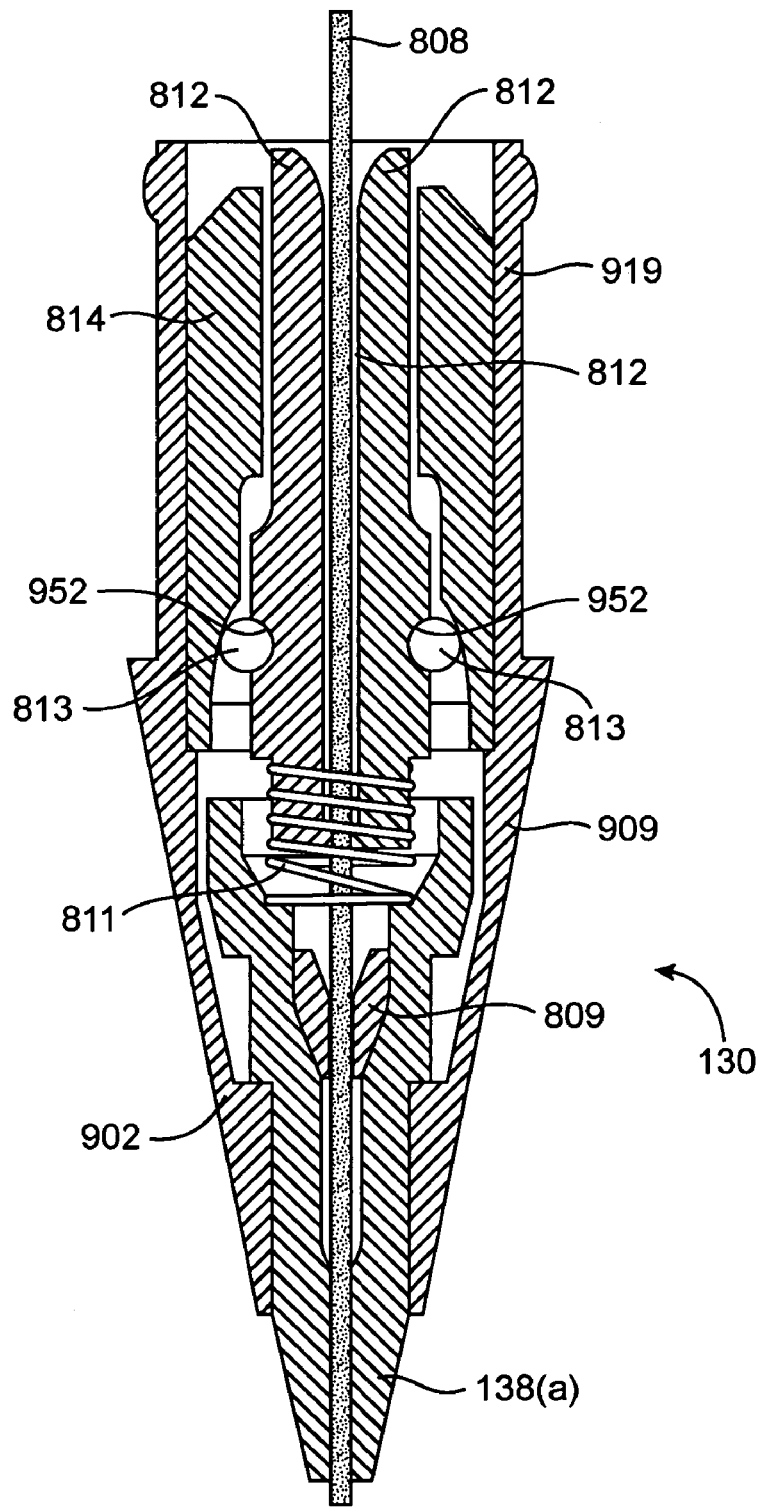
FIG. 3 shows a cross-sectional view of a mechanical pencil including an automatic lead feeding mechanism.

Referring to FIG. 3, the writing element 130 has a tip cover 909 having a smooth outer inclined surface 902, a connecting barrel 919 formed on the tip cover 909 and fitted in a barrel (not shown), a slide member 138(a) slidably mounted in the tip cover 909, a pencil lead 808, a retaining ring 809 for retaining the pencil lead 808, and a clip member 812 that defines a holding portion for holding the pencil lead 808. The clip member 812 has two sides each defining a recess 952 for receiving a ball 813. A clamp structure 814 is mounted around the clip member 812, and a spring 811 is mounted between the clip member 812 and the slide member 138(a).

In use, the pencil lead 808 is pushed outward automatically by the upward pressure on the slide member 138(a) that is exerted by a writing surface such as paper (not shown). The outward advancement of the pencil lead 808 occurs without any intentional manipulation of a lead feeding button by the user. The spring 811 compresses and this causes the clip member 812 to open and release the pencil lead 808. Further details about the automatic pencil shown in FIG. 3 can be found in U.S. Pat. No. 6,254,296, which is herein incorporated by reference in its entirety for all purposes.

Figure 4:
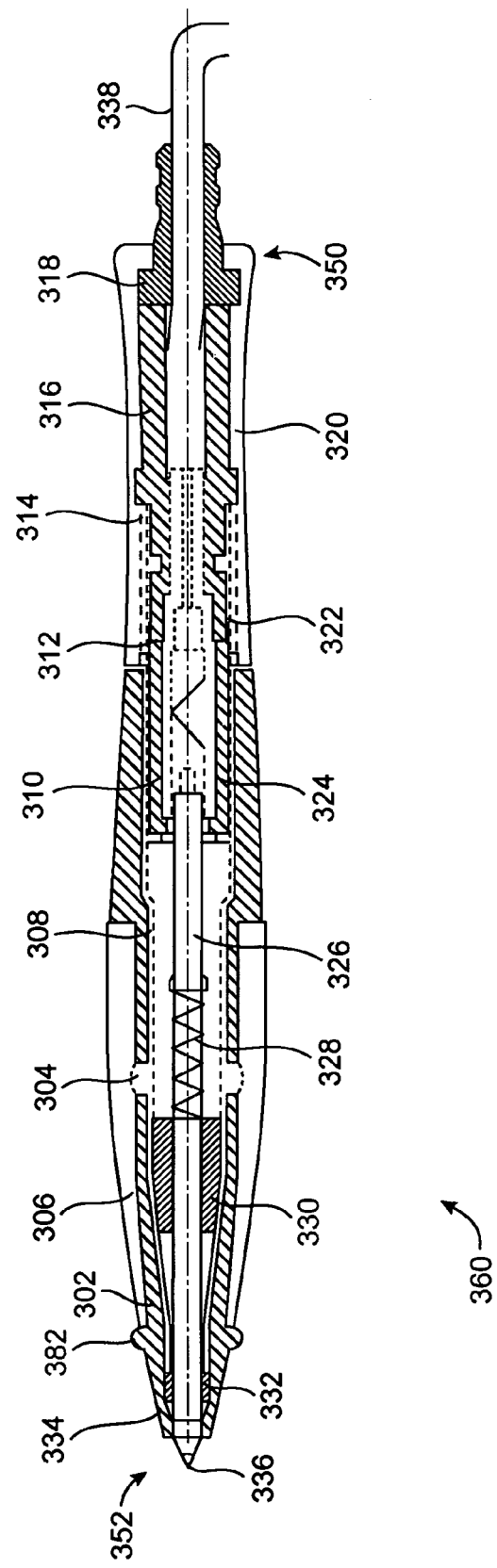
FIG. 4 shows a cross-sectional of a stylus that includes a writing element comprising ink. The writing element is in an extended position.

FIG. 4 shows a cross-section of a stylus 360 according to another embodiment of the invention. Like the stylus shown in FIG. 1, the stylus 360 shown in FIG. 4 includes a proximal end region 350 and a distal end region 352. A cable 338 is coupled to the proximal end region 338 of the stylus 360, and passes through a strain relief element 318 that is at the proximal end region 338.

The stylus 360 includes a writing element 326 that is an ink pen refill. In this example, the writing element 326 is shown in an extended position, because the tip 336 of the writing element 326 is capable of writing. The ink pen refill can comprise a conductive material such as aluminum. The ink pen refill can comprise an erasable or non-erasable ink material.

The distal end region 352 of the stylus 360 includes a front barrel housing portion 302, while the proximal end region 350 of the stylus 360 includes a rear barrel housing portion 320. The rear barrel housing portion 320 houses a rear inner barrel portion 316 that houses the cable 338. The front barrel housing portion 302 and the rear barrel housing portion 320 can rotate with respect to each other in order to cause the first and second cam members 310, 312 to interact. This interaction between the first and second cam members 310, 312 causes the writing element 326 to be in an extended position or a retracted position. The cam members 310, 312, are described in further detail below.

A spring 328 is around the writing element 326. In the absence of a biasing force, the spring 328 biases the writing element 326 into a retracted position. The first and second cam members 310, 312 can rotate with respect to each other and can apply an outward force to the writing element 326 to push it outward into an extended position. The writing element 326 is also releasably secured in the front barrel housing portion 302 with a front bushing 330 so that the writing element 326 is properly positioned in the stylus housing 132.

A conductive cone 332 is at the distal end 352 of the stylus 360. The writing element 326 and the conductive cone 332 can form an antenna (e.g., a receiving antenna) in this embodiment. Unlike the embodiment shown in FIGS. 1 and 2, the writing element 326 in this embodiment can receive a signal, transmit a signal to signal processing electronics, and provide a writing function.

In some embodiments, the conductive cone can be a "floating" conductive cone 332. That is, the writing element 326 may not be in physical contact with the conductive cone 332, or the writing element 326 is in contact with the conductive cone 332, but is movable with respect to the conductive cone 332. In either case, electromagnetic signals can be received by the conductive cone 332 and can be transmitted to the writing element 326, even though a permanent mechanical connection is not present, because they are very close to each other in some embodiments. In this sense, the conductive cone 332 and the writing element 326 can be electrically or capacitively coupled together. Thus, the conductive cone 332 and the writing element 326 may be mechanically separated from each other, but may also be in electrical communication with each other. In other embodiments, it is possible to electrically connect the conductive cone 332 to the writing element 326 with a flexible conductor or other means so that the writing element 326 may move with respect to the conductive cone 332, and may also be both mechanically and electrically connected.

A conductive grip 306 is on the front barrel housing portion 302. The conductive grip 306 is electrically coupled to a first ground shield 308 via a ground connector 304. The first ground shield 308 is connected to a second ground shield 314, which is in the rear barrel housing portion 320. The conductive grip 306 grounds the user when the user contacts the stylus 360 so that signals received by the user do not pass to the conductive writing element 326. A protruding structure 382 is provided at the distal end 352 of the stylus 360. The protruding structure 382 keeps the user's hand on the conductive grip 306 so that the user is grounded.

Figure 5:
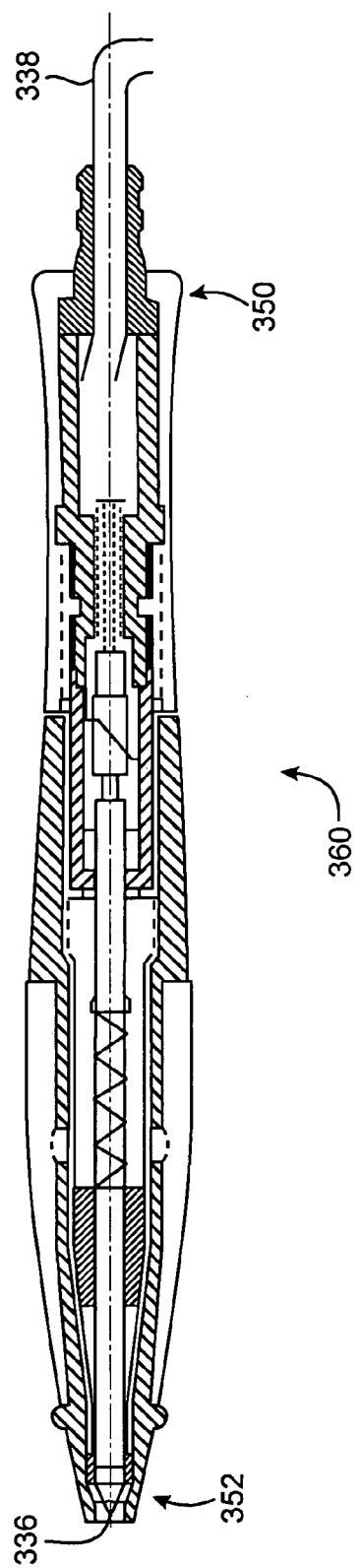
FIG. 5 shows a cross-section of a stylus that includes a writing element comprising ink. The writing element is in a retracted position.

FIG. 5 shows the stylus 360 shown in FIG. 4 in a retracted position. That is, the tip 336 of the writing element 326 is within the front barrel housing portion 302 and cannot be used to write on the surface of a sheet.

FIGS. 6(a) and 6(b) show how the first and second cam members 310, 312 interact with each other. Referring to FIG. 6(a), the first and second cam members 310, 312 have inward ends that face each other and cooperatively fit together so that the writing element 326 is in a retracted position. Referring to FIG. 6(b), the facing ends of the first and second cam members 310, 312 push away from each other. The first cam member 310 pushes the writing element 326 (see FIG. 4) outward so that it is in an extended position and is moved by a distance A.

Figure 7:
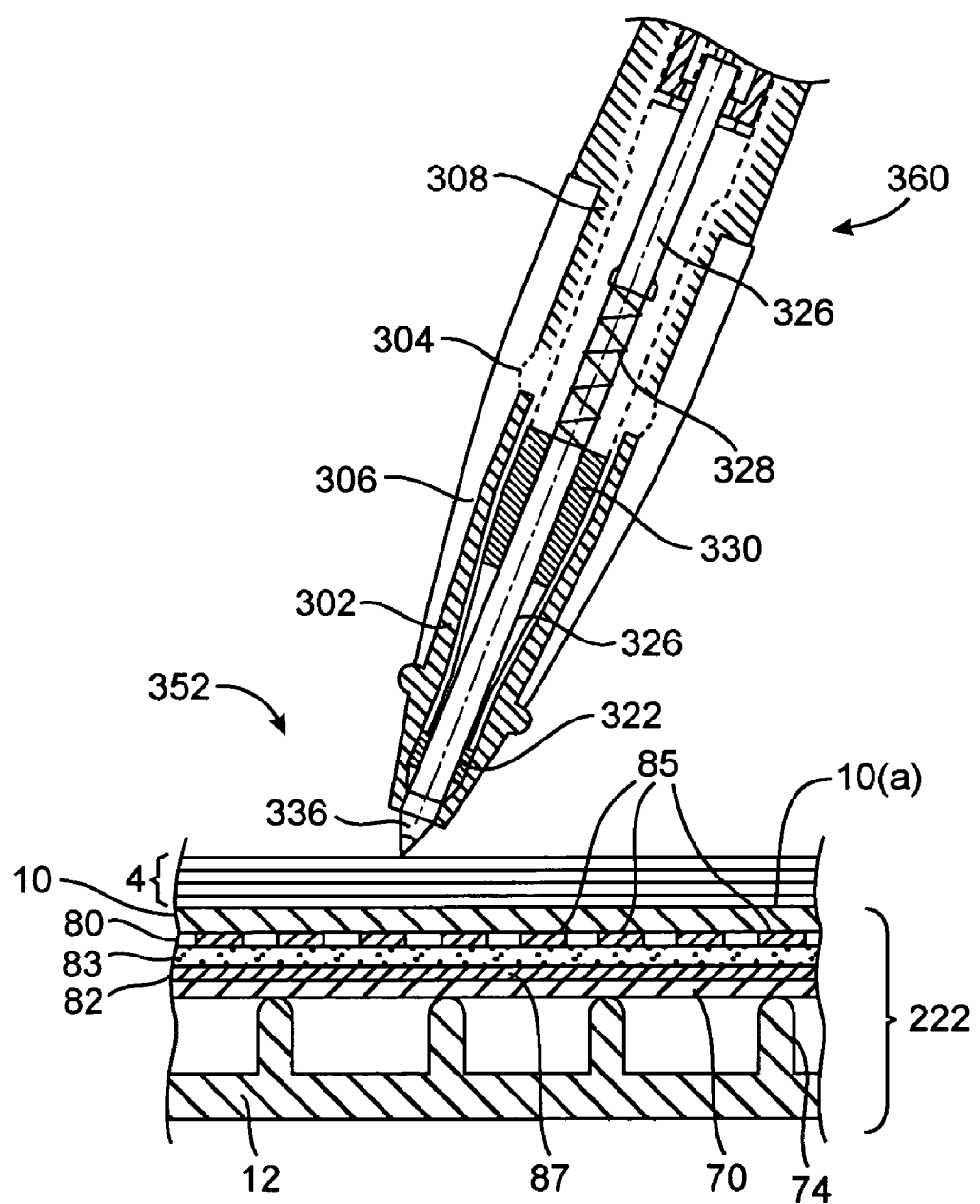
FIG. 7 shows a cross-section of a stylus over a book on a surface of a housing of an electrographic position location apparatus.

FIG. 7 shows how a stylus 360 can be used to both write and receive an electromagnetic signal from under a surface of a housing in an electrographic position location apparatus. In FIG. 7, like elements in the stylus 360 are designated by like numerals as in prior Figures.

The stylus 360 is shown resting on the surface of the page of a book 4 that lies within the recess in the upper section 10 of a housing 222. The upper section 10 includes an upper surface 10(a). Immediately beneath the upper section 10 of the housing 222, lies the conductive fingers 85 of an upper antenna 80. These conductive fingers 85 are provided above an acetate insulating sheet 83 that separates the upper antenna 80 from a lower antenna 82. Disposed on the opposite side of the acetate sheet 83 are the conductive fingers 87 of the lower antenna 82. Beneath the lower antenna 82 lies the protective sheet of a card 70 that is supported by supports 74 of the lower section 12 of the housing 222.

The distal end region 352 of the stylus 360 includes the conductive cone 322 and the conductive tip 336 of the writing element 326. The writing element 326 and the conductive cone 322 may function as a receiving antenna that receives electromagnetic signals from the fingers 85, 87 of the first and second antennas 80, 82 and are thus in electrical communication with each other. The signals are sent to a processor (not shown in FIG. 7) coupled to the writing element 326, and the processor determines the x-y coordinates (over the upper surface 10(a)) of the writing element 326 and/or the particular signals being transmitted by the fingers 85, 87. Once the location of the stylus 360 is known, an output (e.g., an audio output) corresponding to a print element at the location of the stylus 360 and on the book 4 can be produced (since the coordinates of the print element can be determined by the processor).

The user may interact with the book 4 when the writing element 326 is in an extended position or in a retracted position. That is, the user may receive some output corresponding to the particular location of the stylus 360 when the writing element 326 is in either an extended position or a retracted position. For example, different print elements in a print medium on the housing can be selected using the stylus when the writing element in the stylus is in a retracted position or in an extended position. Different outputs can be produced for the different print elements, while the writing element in the stylus is in either a retracted position or an extended position. Illustratively, when the writing element in the stylus is in a retracted position, the user may select an image of the letter "A" on a sheet of paper on a housing of an electrographic position location apparatus. A first output related to the letter A would then be produced by an appropriate output device (e.g., "A says Ahh"). The user may then manipulate the stylus to put the writing element in an extended position. The user may then select or write on the letter "B" on the sheet of paper (or on another sheet) with the stylus. A second output related to the letter B would then be produced by the output device (e.g., "B says Buh").

Figure 8A:
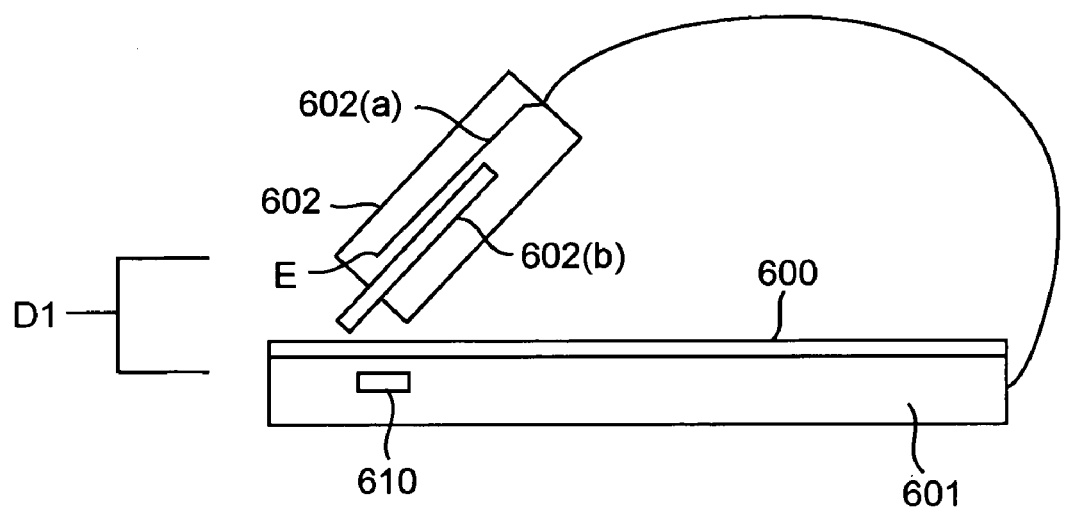
FIGS. 8(a)–(b) are schematic illustrations of styluses, without conductive cones, wherein the styluses are positioned in different ways during use.
Figure 8B:
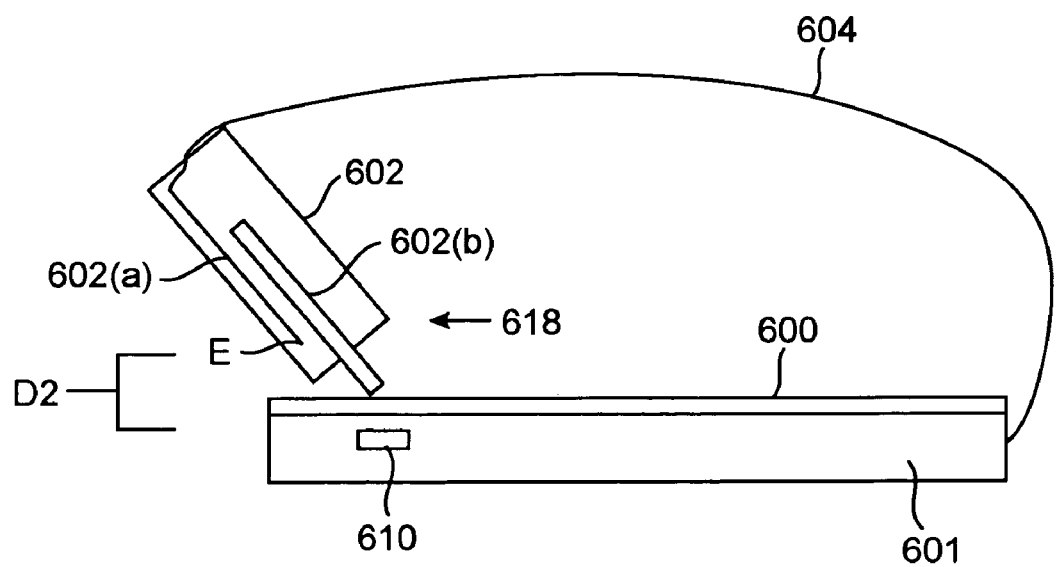

The advantages of using a conductive annular structure, or more particularly a conductive cone, at the distal end of the stylus can be described with reference to FIGS. 8(a)–8(d). FIGS. 8(a)–8(b) show schematic illustrations of a stylus 602 including a conductor 602(a) with a writing element 602(b). The stylus 602 is coupled to a housing 601 via a cable 604. A sheet 600 is on the surface of the housing 601. A conductive finger 610 of a transmitting antenna is inside of the housing 601. As shown, the distance (D1 and D2) between the end E of the conductor 602(a) and the conductive finger 610 is different depending on how the stylus 600 is oriented when the user is writing. The signal transmission distance from the conductive finger 610 to the receiving end E of the conductor 602(a) is also different in each case. The different signal transmission distances makes it difficult for the conductor 602(a) to receive signals of consistent magnitude. Electromagnetic signals that are transmitted from the conductive finger 610 get weaker as the distance from the conductive finger 610 increases.

Figure 8C:
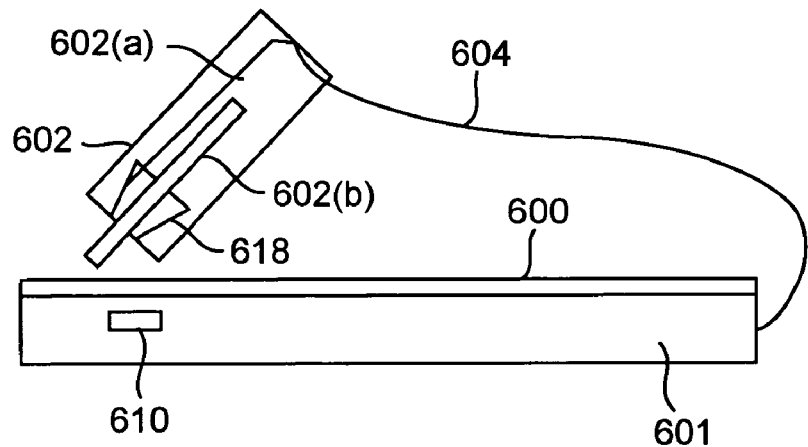
FIGS. 8(c)–(d) are schematic illustrations of styluses, with conductive cones, wherein the styluses are positioned in different ways during use.
Figure 8D:
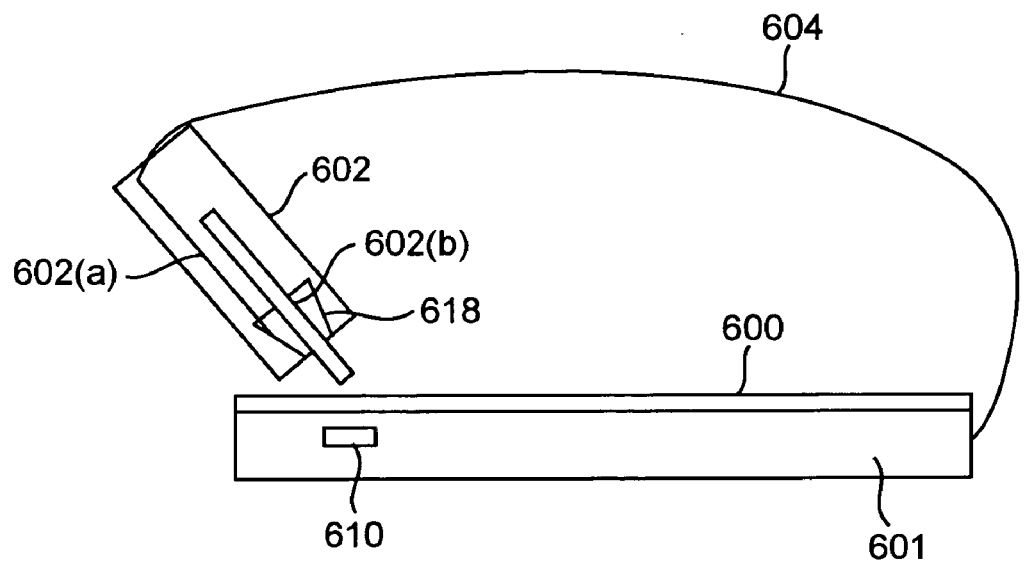

FIGS. 8(c) and 8(d) show how a conductive annular structure around the writing element addresses this problem. FIGS. 8(c) and 8(d) are the same as FIGS. 8(a) and 8(b), except that a conductive annular structure 618 in the form of a conductive cone is present at the distal end of the stylus 602. The conductive annular structure 618 is electrically coupled to the conductor 602(a) and together they can form a receiving antenna. As is apparent from viewing FIGS. 8(c) and 8(d), the transmission distance from the transmitting finger 610 is substantially the same, regardless of the particular orientation of the stylus 602. Accordingly, signals of consistent strength can be received by the conductor 602(a), regardless of the particular orientation of the stylus. This makes the electrographic position location apparatus more reliable.

Figure 9:
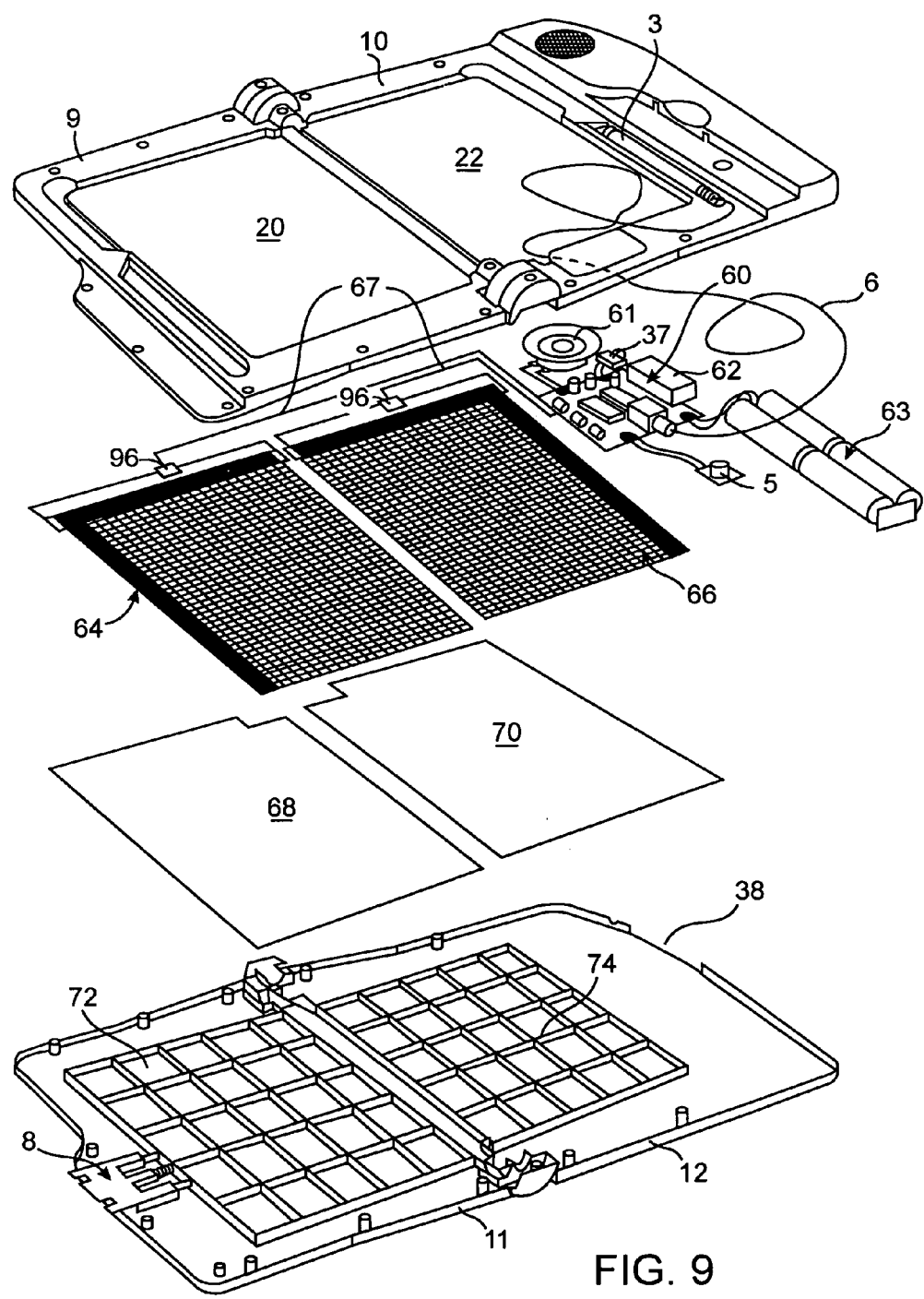
FIG. 9 is an exploded view of an electrographic position location apparatus according to an embodiment of the invention.

FIG. 9 is an exploded view of an electrographic position location apparatus including a platform unit. Platform units and other features are described in U.S. patent application Ser. No. 09/777,262, filed on Feb. 5, 2001, which is herein incorporated by reference in its entirety.

The electrographic position location apparatus shown in FIG. 9 includes a processor 60 that is connected to a loudspeaker 61, an ON/OFF button 5 and a headphone jack 37. A cable 6 couples the processor 60 to a stylus 3. The stylus 3 may be any of the above-described styluses. The processor 60 is connected to a mating interface 62 for receiving a cartridge 39 and a set of batteries 63 for powering the processor 60.

Two antenna elements 64, 66 are connected via cables 67 to the processor 60 enabling the processor 60 to control the timing of signals generated by the first transmitting antenna elements 64, 66. The antenna elements 64, 66 are provided directly beneath rectangular recesses 20, 22. They are sandwiched between the underside of the upper sections 9, 10 of the first and second housings 1, 2 defining the rectangular recesses 20, 22 and sheets of cardboard 68, 70. They rest upon supports 72, 74 on the inside surfaces of the lower sections 11, 12 of the first and second housing portions 1, 2.

Figure 10:
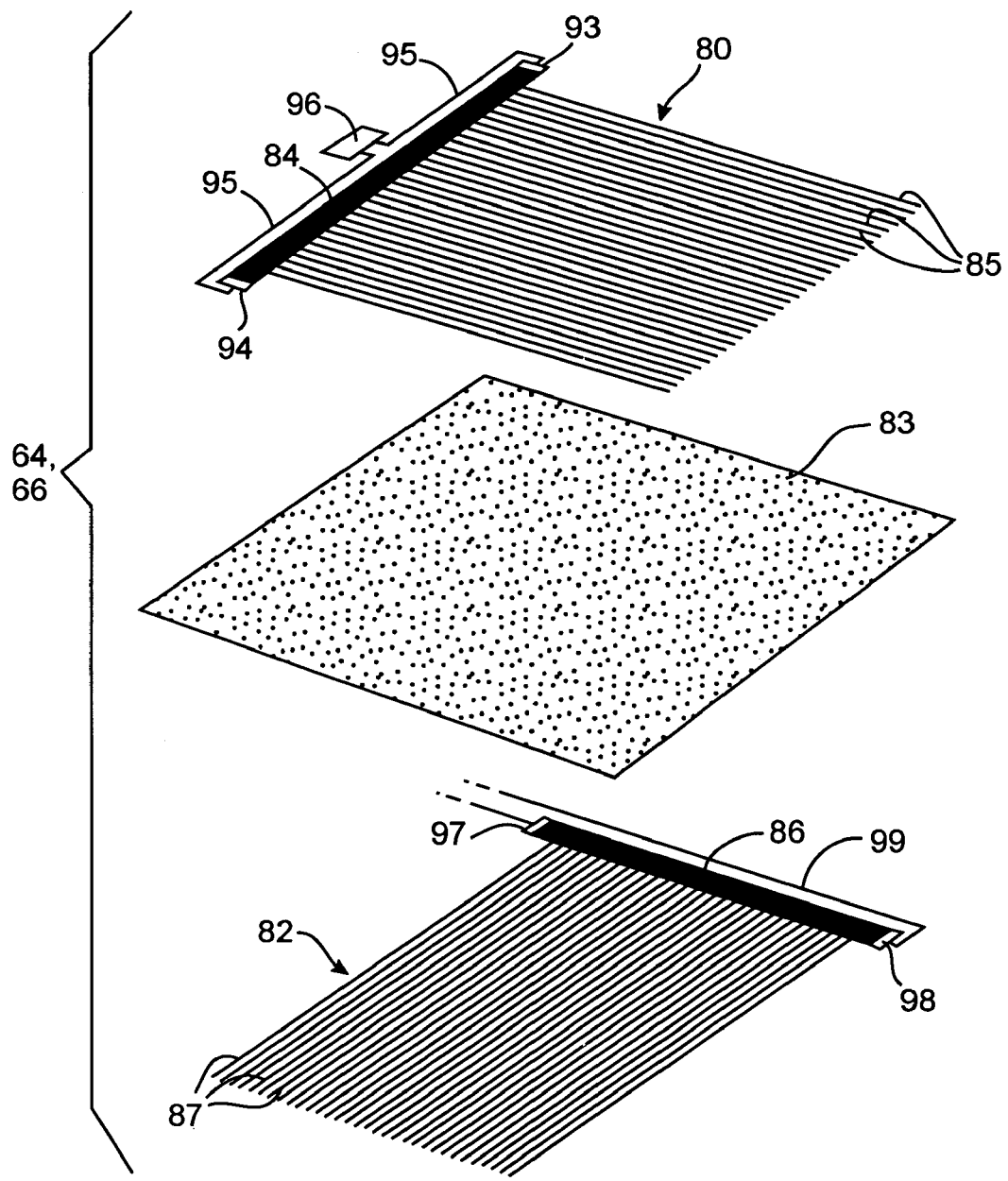
FIG. 10 shows a pair of antennas with orthogonal conductive fingers.

Referring to FIG. 10, each antenna element 64, 66 comprises an upper antenna 80 and a lower antenna 82 separated by an insulating acetate sheet 83. The upper antenna 80 comprises a resistive strip 84 formed by printed conductive ink, that extends along one of the short sides of a rectangle corresponding to the area defined by the rectangular recess 20, 22 beneath which the antenna element is located. Extending away from the resistive strip 84 at right angles to the resistive strip 84 is a plurality of conductive fingers 85 also comprising printed conductive ink. These conductive fingers 85 are spaced equidistantly from one another along the length of the resistive strip 84 and run parallel to one another. The conductive fingers 85 extend from the resistive strip to a length corresponding to the extent of the long side of the rectangular recesses 20, 22.

The lower antenna 82 is disposed on the opposite side of the insulating acetate sheet 83 and comprises a second resistive strip 86. This second resistive strip 86 extends along the periphery of the area along the long side defined by the rectangular recesses 20, 22 beneath which the antenna is located. In a similar arrangement to the arrangement of the upper antenna 80, extending away at right angles from the resistive strip 86 of the lower antenna 82 are a plurality of conductive fingers 87 spaced equidistant from one another along the length of the conductive strip 86. The number of conductive fingers 85, 87 can vary depending on the desired resolution.

The conductive fingers 85, 87 of the second antenna arrangement 66 within the second housing portion 2 form an orthogonal lattice of equally spaced conductive fingers 85, 87 that extends across the entirety of the area defined by the rectangular recess 22 in the upper section 10 of the second housing portion 2 with conductive strips 84, 86 extending beyond the periphery of this area. Similarly, the conductive fingers 85, 87 of the antenna element 64 within the first housing portion 1 define an orthogonal lattice of equally spaced conductive fingers 85, 87 extending beneath the extent of the rectangular recess 20 in the upper section 11 of the first housing portion 1. These orthogonal lattices of conductive fingers 85, 87 are used to generate electromagnetic fields in the vicinity of the surface of the recesses 20, 22 which can be detected by the stylus 3. They are used to determine which portions of a two-dimensional book in the rectangular recesses 20, 22 have been selected with the stylus 3.

Provided at either end of the resistive strip 84 of the upper antenna 80 are first 93 and second 94 electrical contacts that are connected via conductive wiring 95 to an interface 96 and hence via the cable 67 to the processor 60. Similar first 97 and second 98 electrical contacts are provided at either end of the resistive strip 86 of the lower antenna 82. These contacts 97, 98 are also connected via conductive wiring 99 to the interface 96, hence via the cable 67 to the processor 60. As in the case of the upper 80 and lower 82 antennas these electrical contacts 93, 94, 97, 98 and the conductive wiring 95, 99 also comprise conductive ink printed on the surface of the acetate sheet 83.

The electrical contacts 93, 94, 97, 98 and conductive wiring 95, 99 enable electrical signals to be applied to the resistive strips 84, 86. When alternating signals are applied to the resistive strips 84, 86, the conductive fingers 85, 87 connected to the resistive strips 84, 85 to generate an alternating electromagnetic field, which can be detected by the stylus 3. The resistive strips 84, 86 may comprise a voltage divider strip that allows signals of different voltages to transmit from each of the conductive fingers 85, 87. Further details about the voltage divider strip are described in U.S. patent application Ser. No. 09/574,499, filed May 19, 2000. In this U.S. Patent Application, the voltage divider strip includes a number of resistors in series. These resistors allow the conductive fingers 85, 87 to transmit signals of different voltages. Of course, other types of antenna systems may be used. For example, other embodiments that use capacitive division are described in U.S. patent application Ser. No. 10/222,205, filed on Aug. 16, 2002. Both of these applications are assigned to the same assignee as the present application and are herein incorporated by reference for all purposes.

Figure 11:
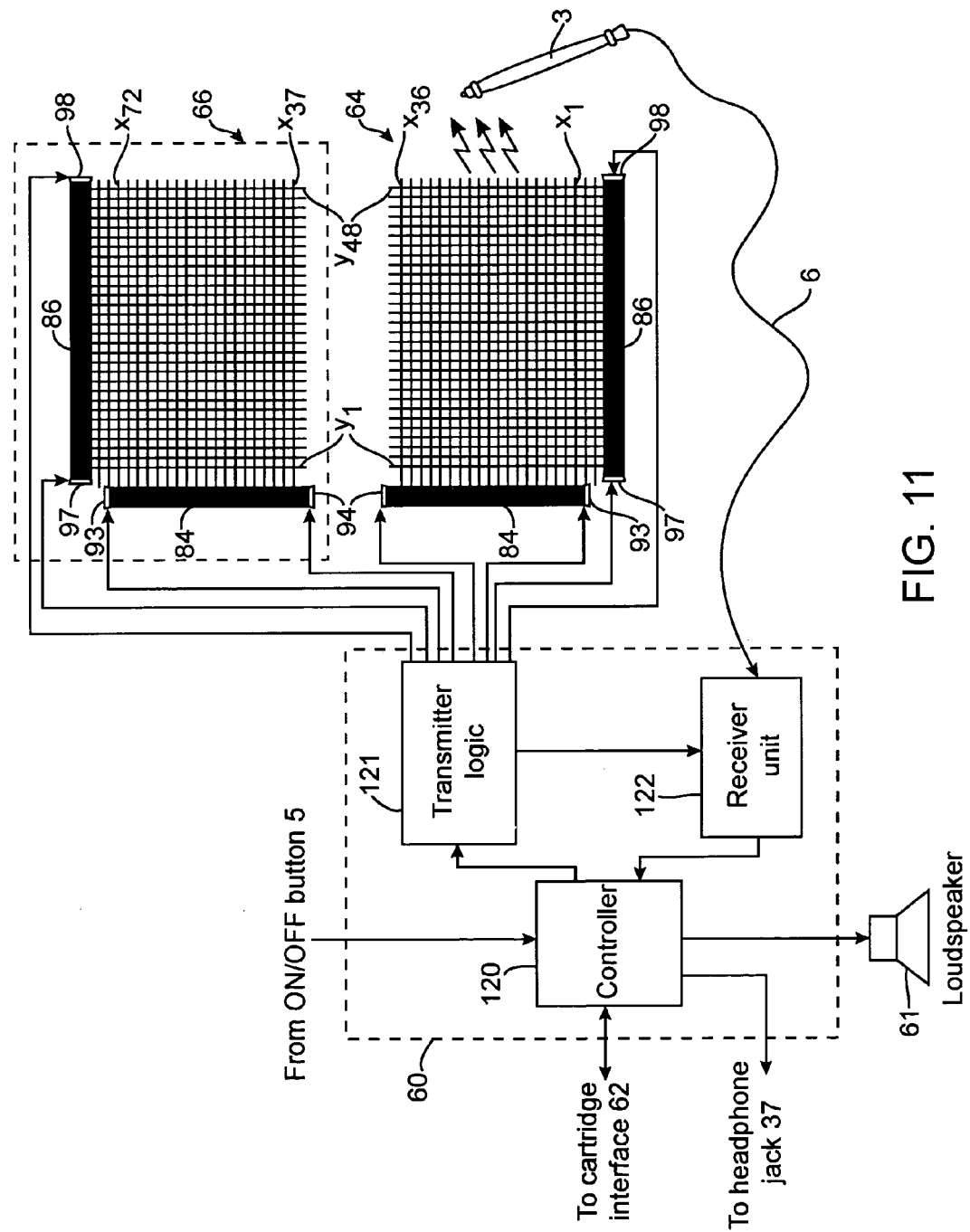
FIG. 11 shows a block diagram of an electrographic position location apparatus according to an embodiment of the invention.

FIG. 11 is a schematic block diagram of the processor 60 and the antenna elements 64, 66. The processor 60 comprises a controller unit 120, transmitter logic 121 and a receiver unit 122. The processor 60 may include a signal driver and a signal processor. The controller unit 120 is connected via the transmitter logic 121 to the antenna elements 64, 66. The controller unit 120 is also connected via the receiver unit 122 via the cable 6 to the stylus 3. The transmitter logic 121 and receiver unit 122 are also connected to each other directly. The controller unit 120 is also connected to the headphone jack 37, the loudspeaker 61, the cartridge mating interface 62 and the ON/OFF button 5.

When the ON/OFF button 5 is pressed, this is detected by the controller unit 120 which causes the transmitter logic 121 to be activated. The transmitter logic 121 then applies electric signals to the electrical contacts 93, 94, 97, 98 of the antenna elements 64, 66 in a sequence of frames. In these frames, each lasting approximately 3 milliseconds, predetermined electrical signals are applied to the contacts 93, 94, 97, 98 of the transmitting antenna arrangements 62, 64. At the end of each frame a different set of signals are then applied to the contacts 93, 94, 97, 98.

In the course of a frame, an electromagnetic field is generated in the vicinity of the rectangular recesses 20, 22 in the upper sections 9, 10 in the first and second housing portions 1, 2. These electromagnetic fields induce voltage potentials in the conductive annular structure at the distal end of the stylus 3. This signal is then passed via the cable 6 to the receiver unit 122. In one example, the voltages applied to the contacts 93, 94, 97, 98 may range between plus three volts and minus three volts. The voltage induced within the conductive annular structure in the stylus 3 can be about 0.5 millivolts. The receiver unit 122 then processes the induced voltage and a processed signal is then passed to the controller unit 120.

The controller unit 120 then converts the processed signals received from the receiver unit 122 into signals identifying the coordinates of the portion of the page of the book 4 at which the stylus 3 is currently located. These coordinates are then used to select an appropriate sound stored within a sound memory either provided as part of the controller unit 120 or alternatively a sound memory provided as a memory chip within a cartridge inserted within the cartridge interface 62. The appropriate sound is then output via the loudspeaker 61 or to a set of headphones via the headphone jack 37.

All of the above patents and patent applications are herein incorporated by reference in their entirety for all purposes. None of the cited patents and patent applications is admitted to be prior art.

Those skilled in the art will appreciate that various adaptations and modifications of the above-described embodiments can be configured without departing from the scope and spirit of the inventions. Therefore, it is to be understood that, within the scope of the appended claims, the invention may be practiced other than as specifically described herein. Moreover, one or more features of an embodiment of the invention may be combined with any other feature of any other embodiment of the invention without departing from the spirit and scope of the invention.

What is claimed is:

1. An electrographic position location apparatus comprising:
   (a) a housing comprising a surface;
   (b) an antenna under the surface;
   (c) a processor coupled to the antenna;
   (d) a stylus comprising (i) a distal end region, (ii) a proximal end region, (iii) a retractable writing element including a first end portion proximate to the distal end region and a second end portion proximate to the proximal end region; and (iv) a conductive annular structure having a continuous and solid side surface around at least the first end portion of the writing element, and being at the distal end region of the stylus;
   (e) a cable coupling the proximal end region of the stylus to the housing; and
   (f) an audio output device coupled to the processor.

2. The electrographic position location apparatus of claim 1 wherein the housing is in the form of a platform.

3. The electrographic position location apparatus of claim 1 wherein the housing is in the form of a globe.

4. The electrographic position location apparatus of claim 1 wherein the housing is in the form of a platform and wherein the electrographic position location apparatus further comprises a book that is on the platform, and wherein the writing element is capable of making marks in the book.

5. The electrographic position location apparatus of claim 1 wherein the antenna is a transmitting antenna and wherein the audio output device is a speaker.

6. The electrographic position location apparatus of claim 1 wherein the antenna is a transmitting antenna and wherein the stylus further comprises a conductor, wherein the conductor is oriented generally parallel to an orientation of the writing element, and wherein the conductor forms a receiving antenna with the conductive annular structure.

7. The electrographic position location apparatus of claim 1 wherein the antenna is a transmitting antenna and wherein the writing element in the stylus forms at least part of a receiving antenna, wherein the writing element is electrically coupled to the conductive annular structure.

8. The electrographic position location apparatus of claim 1 wherein the antenna is a first antenna comprising a first plurality of fingers and wherein the electrographic position location apparatus further comprises a second antenna comprising a second plurality of fingers, wherein the first plurality of fingers is orthogonal to the second plurality of fingers.

9. The electrographic position location apparatus of claim 1 wherein the stylus further comprises a conductive grip at the distal end region, wherein the conductive grip is connected to ground.

10. The electrographic position location apparatus of claim 1 wherein the writing element is an automatic pencil comprising an automatic lead feeding mechanism.

11. The electrographic position location apparatus of claim 1 wherein the writing element comprises lead.

12. The electrographic position location apparatus of claim 1 wherein the writing element comprises ink.

13. The electrographic position location apparatus of claim 1 wherein the writing element comprises erasable ink.

14. An electrographic position location apparatus comprising:
   (a) a housing comprising a surface;
   (b) an antenna under the surface;
   (c) a processor coupled to the antenna;
   (d) a stylus comprising (i) a distal end region, (ii) a proximal end region, and (iii) a retractable writing element including a first end portion proximate to the distal end region and a second end portion proximate to the proximal end region;
   (e) a cable connecting the proximal end region of the stylus to the housing; and
   (f) an audio output device coupled to the processor.

15. The electrographic position location apparatus of claim 14 wherein the housing is in the form of a platform.

16. The electrographic position location apparatus of claim 14 wherein the housing includes a globe.

17. The electrographic position location apparatus of claim 14 wherein the housing is in the form of a platform and wherein a book is on the platform, and wherein the writing element is capable of making marks in the book.

18. The electrographic position location apparatus of claim 14 wherein the antenna is a transmitting antenna.

19. The electrographic position location apparatus of claim 14 wherein the antenna is a transmitting antenna and wherein the stylus further comprises a conductor, wherein the conductor is oriented generally parallel to an orientation of the writing element, and wherein the conductor forms at least part of a receiving antenna.

20. The electrographic position location apparatus of claim 14 wherein the stylus further comprises a conductive cone around the first end portion of the retractable writing element, wherein the antenna is a transmitting antenna and wherein the writing element in the stylus forms at least part of a receiving antenna, wherein the writing element is electrically coupled to the conductive cone.

21. The electrographic position location apparatus of claim 14 wherein the antenna is a first antenna comprising a first plurality of fingers and wherein the electrographic position location apparatus further comprises a second antenna comprising a second plurality of fingers, wherein the first plurality of fingers is orthogonal to the second plurality of fingers.

22. The electrographic position location apparatus of claim 14 wherein the stylus further comprises a conductive grip at the distal end region, and wherein the conductive grip is connected to ground.

23. The electrographic position location apparatus of claim 14 wherein the writing element is a pencil comprising an automatic lead feeding mechanism.

24. The electrographic position location apparatus of claim 14 wherein the writing element comprises lead.

25. The electrographic position location apparatus of claim 14 wherein the writing element comprises ink.

26. The electrographic position location apparatus of claim 14 wherein the writing element comprises erasable ink.

27. The electrographic position location apparatus of claim 14 wherein the stylus further comprises a conductive cone around the first end portion of the retractable writing element.

28. An electrographic position location apparatus comprising:
  (a) a housing comprising a surface;
  (b) an antenna under the surface;
  (c) a processor coupled to the antenna;
  (d) a stylus comprising (i) a distal end region, (ii) a proximal end region, and (iii) a retractable, conductive writing element including a first end portion proximate to the distal end region and a second end portion proximate to the proximal end region;
  (e) a cable connecting the proximal end region of the stylus to the housing; and
  (f) an audio output device coupled to the processor, wherein the output device is an audio output device, wherein the antenna and the writing element are in electrical communication during use.

29. The electrographic position location apparatus of claim 28 further comprising a conductive cone at the distal end of the stylus.

30. The electrographic position location apparatus of claim 28 further comprising a book on the surface.

31. The electrographic position location apparatus of claim 28 wherein the stylus further comprises a conductive grip at the proximal end region.

32. The electrographic position location apparatus of claim 28 wherein the housing is in the form of a platform.

33. A method comprising:
  (a) providing a sheet on a surface of a housing of an electrographic position location apparatus, wherein an antenna is under the surface of the housing and transmits an electromagnetic signal; and
  (b) writing on the sheet with a stylus including a retractable, conductive writing element, wherein the transmitted signal passes through the conductive writing element; and
  (c) listening to an audio output in response to writing.

34. The method of claim 33 wherein the conductive writing element comprises a pen.

35. The method of claim 33 wherein the conductive writing element is a pencil.

36. The method of claim 33 wherein the conductive writing element comprises erasable ink.

* * * * *